United States Patent

[11] 3,554,474

| [72] | Inventor | David M. Davies<br>W. 3235 Rosewood Ave., Spokane, Wash.<br>99208 |
|---|---|---|
| [21] | Appl. No. | 749,824 |
| [22] | Filed | Aug. 2, 1968 |
| [45] | Patented | Jan. 12, 1971 |

[54] TRESTLE FOR FLEXIBLE PIPE
4 Claims, 9 Drawing Figs.
[52] U.S. Cl. .................................................. 248/49,
248/83
[51] Int. Cl. ...................................................... F16l 3/10,
F16l 3/14
[50] Field of Search............................................ 248/49, 80,
81, 82, 83, 84, 85, 86, 87, 88; 138/106; 108/64,
65, 103, 104

[56] References Cited
UNITED STATES PATENTS

| 463,004 | 11/1891 | Stevenson .................... | 108/104 |
| 2,846,168 | 8/1958 | Schroeter..................... | 248/49 |
| 3,169,741 | 2/1965 | Bittner ........................ | 248/49 |

*Primary Examiner*—Chancellor E. Harris
*Attorney*—Keith S. Bergman

ABSTRACT: A trestle comprising plural similar structural elements releasably, movably joined to form a structure supported by releasably attached vertically adjustable legs upon a supporting surface therebeneath. The trestle is adapted particularly to support a flexible pipe such as the common trailer sewage disposal pipe. The elements may be moved relative each other to determine trestle angle and direction by adjustment of intercommunicating nut-bolt combinations, and the legs may be adjusted to determine vertical orientation of the trestle relative the supporting surface.

PATENTED JAN 12 1971
3,554,474
SHEET 1 OF 2
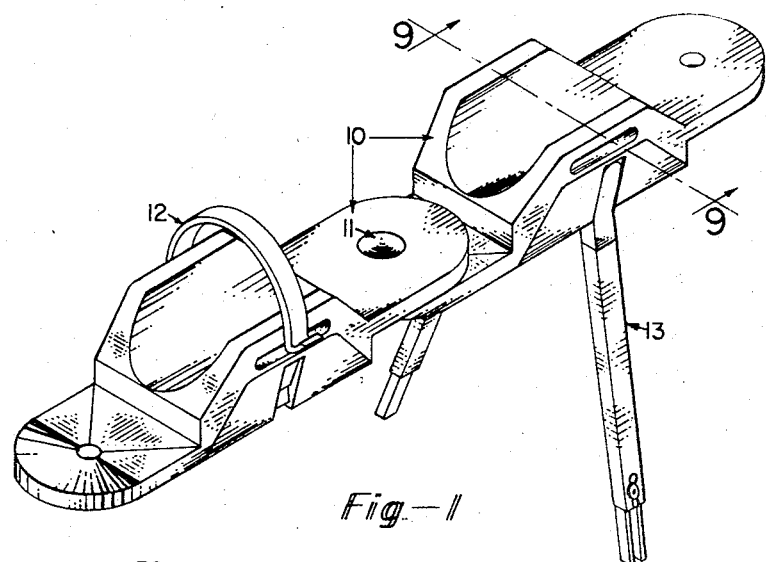
Fig.—1
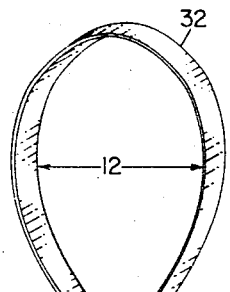
Fig.—2
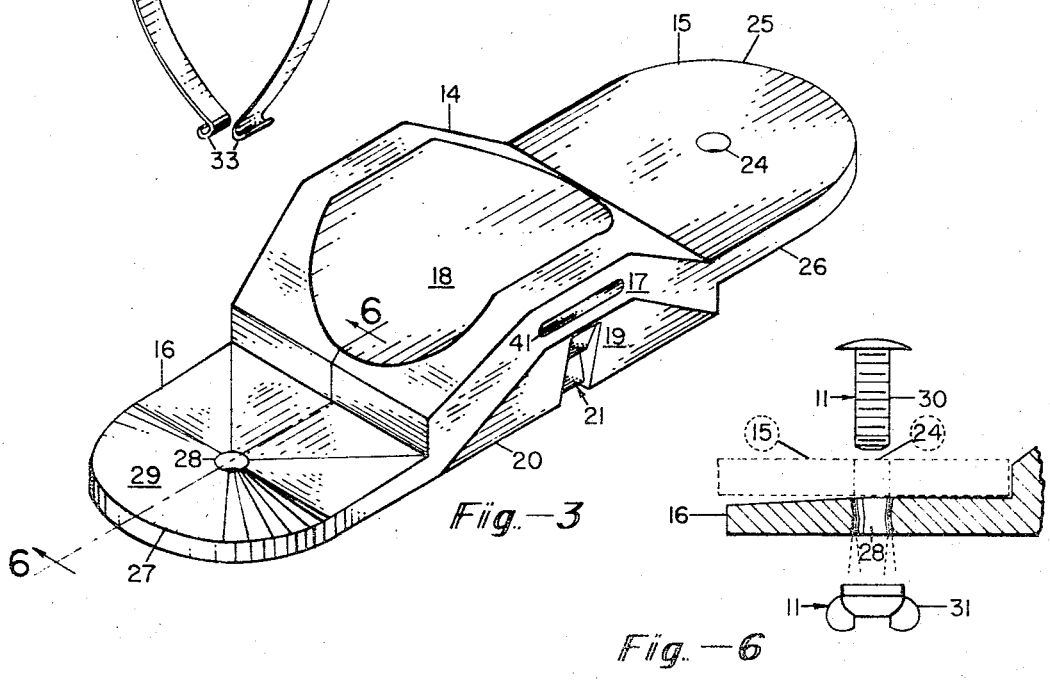
Fig.—3
Fig.—6
David M. Davies, INVENTOR.
BY PATENTED JAN 12 1971
3,554,474
SHEET 2 OF 2
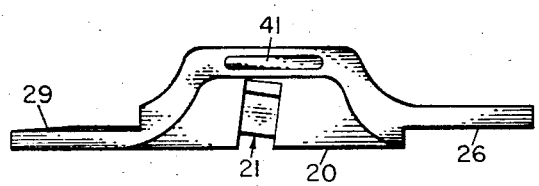
Fig.—4
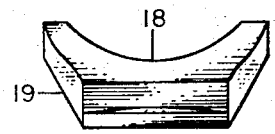
Fig.—5
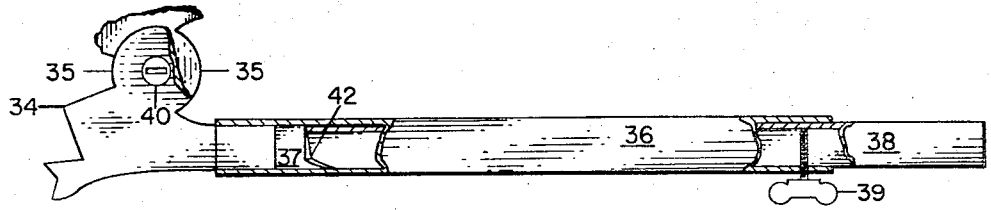
Fig.—8
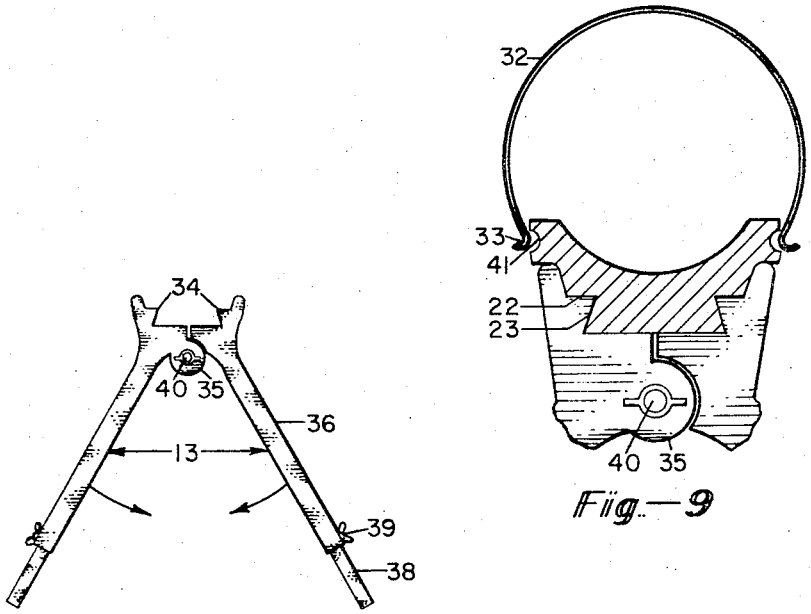
Fig.—7
Fig.—9
David M. Davies, INVENTOR.
BY

TRESTLE FOR FLEXIBLE PIPE

II. BACKGROUND OF INVENTION

IIA. Related Applications

There are no applications related hereto filed in this or any foreign country at this time.

IIB. Field of Invention

This invention relates generally to adjustable trestles and more particularly to such a trestle having plural similar elements releasably and movably joined relative each other and adjustably supported above a surface to support flexible pipe.

IIC. Description of Prior Art

Flexible pipes, especially those of the plastic variety, have become an extensively used item of commerce. In the smaller diameters, especially of the more rigid walled variety of pipe, the structure tends to be self-supporting, or at least it is sufficiently self-supporting that it may be supported only at discreetly spaced points. Matter carried in such a pipe is not of such great volume that its materially effects the support.

With the advent of larger diameter plastic pipes, especially those formed of softer plastics and with a diameter of some several inches, the pipe becomes relatively nonrigid when considered in relation to its use and environs. Such larger pipes similarly contain a greater volume of material resulting in a greater mass that must be supported by the containing pipe and consequently by its support. With such structures it becomes necessary that they be supported at closely spaced points along their length, if not continuously.

Such large diameter plastic pipe has become common to carry sewage waste from a house trailer to some adjacent disposal facility. The instant invention is adapted particularly to support such a sewage pipe, though it is not limited to this use and obviously may be used to support various other flexible pipes or pipelike structures.

Pipe support structures heretofore known may be conveniently classified into a first class providing support of the pipe at plural spaced points and a second class providing continuous support.

Members of the first class are adapted for use with rigid pipe or at least pipe that is substantially self-supporting. Such pipe is exemplified by the metalic structures that have come into common use in plumbing. This pipe is generally supported by its environs such as the earth or rigid structural elements and in some cases at a substantially spaced distance from the structural element providing the ultimate support. This type of support is readily distinguishable from the instant invention in that the supported pipe is of sufficient size and flexibility that it is not self-supporting over any substantial element of length.

Members of the second class are not so numerous as those of the first, but have become known. One specie of the group provides some rigid structure defining a channel adapted to support a flexible pipe, and in turn be supported by some other structure. This specie is distinguished from the instant invention in that it generally is a relatively permanent type installation, of substantial cost and one which is not conveniently movable. Such structures are generally not compound to allow adjustable change either in course of pipe or its gradient. Another specie of this class has provided support about the entire periphery of a pipe. These structures, in general, have had some added purpose other than support, such as installation, pressure relief or the like, and because of this they are readily distinguishable in that they are rigid and do not provide for adjustment, placement of pipe is difficult and they are quite costly.

III. SUMMARY OF INVENTION

My invention provides a trestle with plural, similar adjustably communicating support elements supported above a supporting surface by plural, adjustable legs to provide a structure that may be readily assembled and disassembled and when assembled adjusted both as to course and gradient relative the supporting surface.

To accomplish this function I provide plural trestle elements, each with central body having a pipe supporting saddle and means for attachment of adjustable legs with forwardly and rearwardly extending fastening tongues of particular configuration. The forward fastening tongue of one element may be releasably and adjustably fastened to the rearward tongue of another element by means of a nut-bolt combination to provide a supporting trestle of any desired length that may be variously oriented as to its course.

The adjustable legs of my invention are formed from two pivotably joined elements of scissorlike nature, adapted by a particular wedge-type joint to releasably, but rigidly, communicate with the body of the trestle elements. Each support leg is provided with an adjustably extensible lower portion to allow vertical adjustment of the trestle support relative the supporting surface therebeneath.

The various elements of my invention are similarly styled to be readily adaptable to economic manufacture by a casting or similar continuous manufacturing process.

In providing such structure it is:

A principal object of my invention to provide a trestle compounded of similar releasably and adjustably joined elements to support a flexible plastic pipe against gravity displacement along an adjustable course.

A further object of my invention to provide such a structure that is supported above some rigid surface therebeneath by plural vertically adjustable legs to provide an adjustable gradient for the trestle.

A further object of my invention to provide such a structure that may be readily assembled and disassembled for transportation and storage during periods of nonuse.

A further object of my invention to provide such a structure that is formed from a relatively small number of identical elements that may be conveniently cast or produced by other similar mass manufacturing process.

A still further object of my invention to provide such a trestle structure that is particularly adapted to support a flexible plastic pipe such as commonly used to discharge sewage effluent from a trailer to an adjacent receiving structure.

A still further object of my invention to provide such a structure that is of new and novel design, of rugged and durable nature, of simple and economic manufacture and one that is otherwise well adapted to the uses and purposes for which it is intended.

Other and further objects of my invention will appear from the following specification and accompanying drawings which form a part of this application.

In carrying out the objects of my invention, however, it is to be understood that its essential features are susceptible of change in design and structural arrangement with only one preferred practical embodiment being illustrated in the accompany drawings, as required.

IV. BRIEF DESCRIPTION OF DRAWINGS

In the accompanying drawings which form a part of this application, and wherein like numbers of reference refer to similar parts throughout:

FIG. 1 is an isometric view of a partial section of trestle with supporting legs attached to show the various elements and their relationship.

FIG. 2 is an isometric view of a pipe fastening clip of my invention.

FIG. 3 is a somewhat enlarged isometric view of a trestle element showing particularly its configuration and structure.

FIG. 4 is an elongate side view of the trestle element of FIG. 3.

FIG. 5 is an end view of the trestle element of FIG. 3.

FIG. 6 is a partial cross-sectional view through the fastening hole of the forward fastening flange of the trestle element of FIG. 3 taken on the line 6-6 thereon in the direction indicated by the arrows.

FIG. 7 is an orthographic view of two joined legs of my invention, showing their general configuration, structure and method of joinder.

FIG. 8 is an orthographic view, partially cut away, of one leg element of the structure in FIG. 7, illustrating particularly the method of vertical adjustment.

FIG. 9 is a cross-sectional view through the joinder of the leg structure to a body element taken on a line such as 9-9 on FIG. 1, in the direction indicated by the arrows thereon.

V. DESCRIPTION OF THE PREFERRED EMBODIMENT

Referring now to the drawings in more detail and particularly to that of FIG. 1, it is seen that my invention generally comprises plural trestle elements 10 adjustably communicating by fasteners 11, supporting plural pipe clips 12 and in turn being supported by adjustable, releasable legs 13.

Trestle elements 10 have medial body portion 14 structurally communicating with rearward (higher) fastening flange 15 and forward (lower) fastening flange 16. The lateral part of medial body portion 14 provides upwardly extending sides 17 allowing the definition of the partially cylindrical pipe supporting saddle 18 in the uppermost medial part of the body. Lower body sides 19 angle downwardly and inwardly to terminate in the substantially planar lower surface 20. Leg fastening slot 21 is provided in the medial portion of each lower side 19; the channellike structure extends in a downward and slightly forward direction with particular cross-sectional configuration illustrated bestly in FIG. 9, providing inwardly extending surfaces 22, 23 adapted to receive the fastening notch of a leg member to aid in maintaining this member in appropriate position upon the body as hereinafter more fully discussed.

Rearward flange 15 is a substantially planar member having its upper medial surface substantially coplanar with the lowermost medial surface of the pipe support saddle 18 so that a pipe supported by the structure will be supported continuously both by surface 18 and the upper surface of the rearward flange against gravity displacement. Hole 24 is provided in the medial part of rearward flange 15 to aid in receiving fasteners 11 communicating between two adjacent trestle elements 10.

The center of hole 24 serves as a radius to determine the rearward arcuate periphery 25 of the rearward flange. This configuration is desired to allow a pivotable motion of one trestle element relative an adjacent one. Lower surface 26 of rearward flange 15 is offset above lower surface 20 of medial body portion 14 to allow forward flange 16 of an adjacent structure to fit thereagainst with its lowermost surface substantially coplanar with the lower surface 20 of the medial body 14.

Forward flange 16 is similarly shaped as rearward flange 15 with forward arcuate periphery 27 and fastening hole 28 in its medial part. This fastening hole must allow some slight angular motion of the fastener in a plane through the longer axis of the trestle element so its shape is that of a cylinder that has been moved with its axis of rotation slightly angled both in a rearward and a forward plane rather than that of a straight cylinder, all as shown in the illustration of FIG. 6.

The upper surface of forward flange 16 is disposed a spaced distance vertically below the lowermost surface of pipe supporting saddle 18 so that the rearward flange of an adjacent trestle member may be positioned thereon with its upper surface substantially coplanar with the lowermost surface of the pipe supporting saddle to provide a substantially coplanar support for the lowermost surface of a supported pipe as aforesaid. The forward and laterally facing upper surface 29 of the forward flange is not a planar but rather defines part of the lateral surface of a very short truncated cone having its axis substantially coincident with the center of hole 28. The difference in height between this surface at hole 28 and at the forwardmost portion of arcuate periphery 27 need be only very slight, but this configuration allows some angular difference in orientation of one trestle member relative its neighbor so that when several are assembled the grade established through a plurality of such members need not necessarily be uniform. The lower surface of forward flange 16 is substantially coplanar with lower surface 20 of medial body part 14.

These various features of the medial body portion require only rigidity and particular surface configuration to accomplish their results and, therefore, various internal structural communications may obviously be modified between the various functional surface elements. The structure illustrated is preferably accomplished by casting from metal or plastic material although other structural materials and methods of formation might be readily accomplished to provide the functional units described.

The fasteners by which adjacent trestle elements 10 communicate are preferably flat headed bolts 30 and threadedly engaged wing nuts 31. Obviously many other types of fasteners might be used for this purpose, but I prefer nuts and bolts because of their low cost, ready accessibility, and convenient range of adjustment. It is to be noted that with this type fastener, in consideration of the shape of upper surface 29 of forward flange 16 and configuration of hole 28, there may be slight angular and pivotal adjustment of one trestle element relative another, especially in a substantially forward rearward extending dimension.

Pipe clips 12 are springlike elements having arcuately shaped body 32 and turned back end elements 33 adapted to fit with elongate clip fastening slots 41. Clip body 32, at least, is formed of an elastically deformable material, such as spring steel, to a relaxed shape somewhat smaller than that which it will assume in supporting a pipe on one of the trestle elements so that when it is positioned as illustrated in FIG. 1, to support a pipe, the elastic deformity created therein will maintain it in appropriate position against normal accidental displacement forces but will yet allow manual manipulation during placement and removal. I have found a device of the nature of an ordinary pants-cuff clip used by many bicyclists to be well adapted to this purpose.

Leg structure 13 is shown bestly in FIGS. 7, 8 and 9, where it is seen to include two similar leg elements pivotably joined in scissorlike fashion. Each leg has an upper fastening surface adapted to conformably fit within fastening slot 21 with an appropriate projection 34 adapted to fit within the groove created between surfaces 22, 23 of the fastening slot. The medial upper portion of the leg carries fastening ear 35 appropriately offset to receive its opposed counterpart. A hole is provided in the medial portion of the fastening ear to receive a pivotably joining nut-bolt combination 40. Lower leg part 36 is a hollow element having internal channel 37 to slidably support leg extension 38 therein. Preferably this leg extension is of the U-cross-sectional form illustrated so that wing bolt 39 may extend in threaded engagement through an appropriate hole in the lower part of leg 36 to communicate with extension 38 and create friction therebetween to provide adjustably positioning of the leg members. The extension is maintained within the leg channel by crimped end 42.

Two similar leg elements are joined by nut-bolt combination 40, is illustrated in FIGS. 7, 8 and 9, to form the completed leg unit. This unit, it is noted, will be pivotably connected by the bolt and the friction of this pivotable communication may be adjusted by positioning of the nut on the bolt. The legs may then be pivotably moved in toward each other for placement upon a trestle element 10 and when appropriately placed may be laterally extended to provide an intimate communication which by its dovetaillike nature when established will be enhanced by any vertical forces upon the members.

Having thusly described the structure of my invention, its operation may now be understood.

The necessary structures are provided according to the foregoing specification and a plurality of trestle elements 10 are joined together by fasteners 11 to form a trestle of desired length. Plural leg units 13 are then adjusted to appropriate vertical dimension and positioned on the trestle elements at spaced points therealong to support it at the desired grade.

It is to be noted that although leg units could be used on each trestle element, this is not necessary as the trestle elements, though moveable, are quite structurally rigid in their joinder and very oftentimes will provide sufficient support with only the ends of the trestle supported on an underlying surface. It is further to be noted that if fasteners 11 are not cinched too tightly the structure will tend to be somewhat self-adjusting in a vertical dimension and will provide a substantially uniform gradient between an initial higher point at one end and lower point at the other.

The formed element is then positioned with appropriate planar course and a flexible plastic pipe may then be placed thereon to be supported by the trestle against gravity displacement. After the pipe is positioned plural pipe clamps 12 may be positioned if desired to aid in maintaining the pipe on the trestle against accidental nongravitational displacement forces. These clips are such that they may be manually manipulated for placement but yet be sufficiently elastically deformed to maintain their positioning against substantial forces. Again, if pipe clamps be needed, they may be positioned on each trestle element, but most commonly this is not necessary and they very oftentimes are needed only at spaced distances or in some instances not at all, especially if a pipe be full of material as the forces of gravity will well maintain it within pipe supporting saddles 18.

It is to be particularly noted that all of the various individual elements of my invention are relatively small and all may be disassembled for convenience in moving and storage.

It is further to be noted that the trestle provided may be quite readily adjustable, both as to planar course and vertical gradient to provide very nearly any desired combinations.

It is further to be noted that though the structure provided is designed primarily for support of large plastic sewage disposal pipes against gravitational forces, the device might well be applied to the support of any elongate flexible pipelike member.

The foregoing description of my invention is necessarily of a detailed nature so that a specific embodiment of it might be set forth, as required, but it is to be understood that various modifications of detail, rearrangement and multiplication of parts may be resorted to without departing from its spirit, essence or scope.

I claim:

1. An adjustably positionable trestle to support flexible pipe comprising, in combination:

a plurality of trestle elements each having a medial body portion, with means for releasably attaching supporting legs and means of maintaining a pipe thereon, and with flanges oppositely extending, in the axial direction of a pipe to be supported, each flange having an arcuate outer periphery and means of releasably fastening to an opposite cooperating flange of an adjacent element;

means of releasably fastening the opposed flange of one adjacent trestle element to that of another wherein the oppositely extending fastening flanges are offset so that when in communication the upper surface of the trestle elements is substantially coplanar to continuously support a pipelike element over both the body part and the flange part of the trestle; and a plurality of adjustably extensible legs adapted to be releasably carried by the trestle elements to support them at predetermined positions above a supporting surface.

2. The invention of claim 1 wherein at least one of the flanges in its forward surface is configured as a partial section of a truncated cone to allow adjustment between trestle elements and the fastening means between trestle elements comprise nut-bolt combinations extending through holes in the communicating flanges, at least one of which holes is somewhat larger than the bolt to allow angular positioning of one trestle member relative another.

3. The invention of claim 1 wherein the supporting legs are carried in leg fastening slots in the opposed lower lateral portions of the trestle body, and further characterized by: the supporting legs comprising two elements pivotably joined in scissorlike fashion with the fastening slot providing communication between trestle body element and legs configured as a dovetail joint so that when positioned, vertical loads on the legs aid the fastening of the leg to body.

4. In a trestle structure to support a flexible pipelike member, the combination comprising a trestle element having a medial body with means for supporting a pipe against displacement and oppositely extending flanges, each offset and adapted to releasably and movably communicate with an adjacent element to present a coplanar upper surface to support the lowermost element of the pipelike structure, each of such flanges having means for adjustable attachment to a cooperating opposed flange of an adjacent trestle element, the said trestle structure supported at a spaced distance above a horizontal surface by at least one leg structure comprising pivotably joined vertically adjustable legs communicating with a leg slot in a trestle element by a dovetail-type joint to resist displacement upon application of vertical forces.